May 23, 1972      I. HOLLANDER      3,664,790
PLASTIC EXTRUSION APPARATUS
Filed Dec. 5, 1969      2 Sheets-Sheet 2
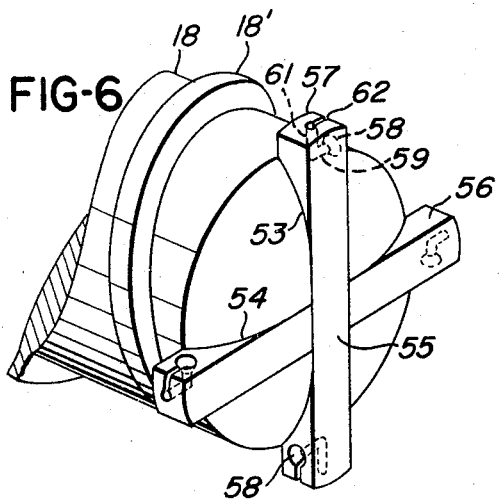
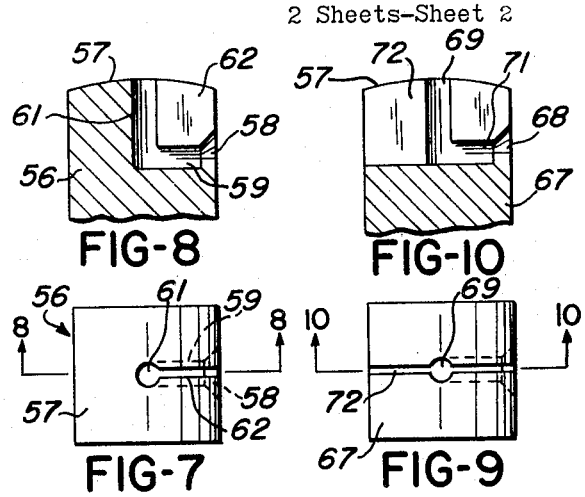
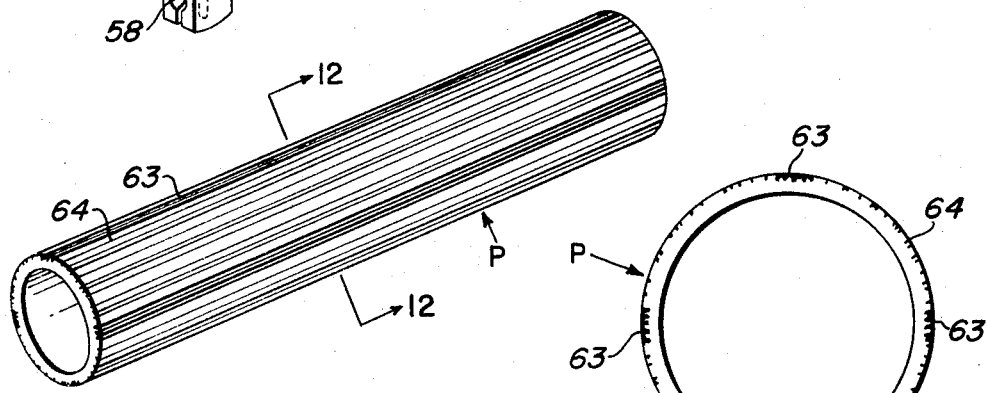
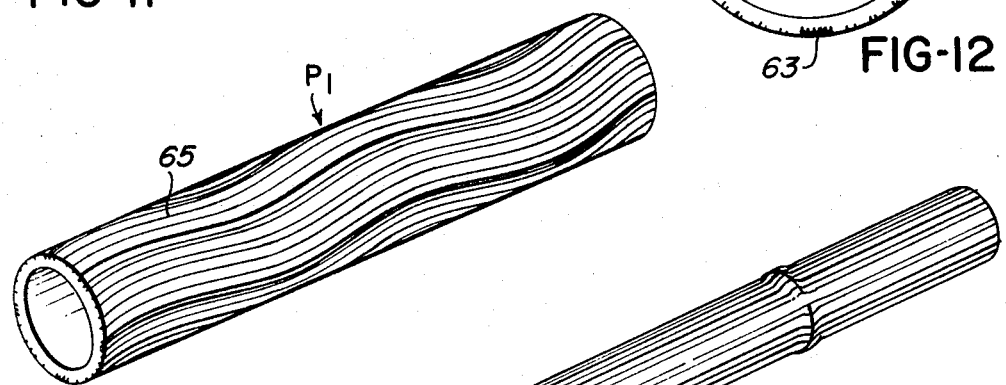
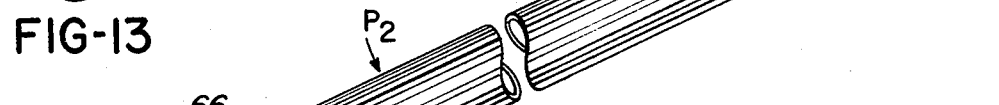
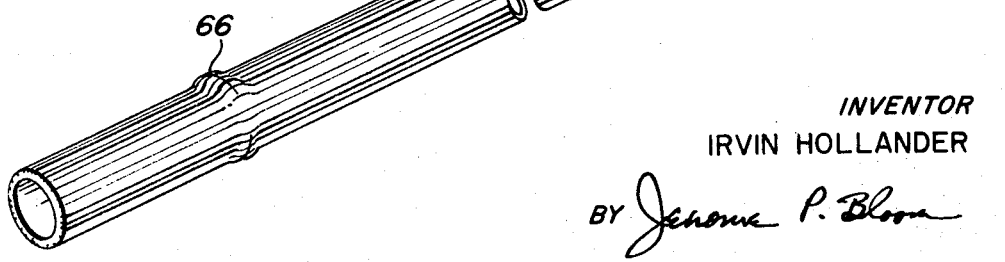
INVENTOR
IRVIN HOLLANDER
BY Jerome P. Bloom
ATTORNEY United States Patent Office 3,664,790
Patented May 23, 1972

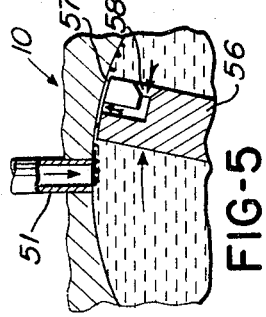
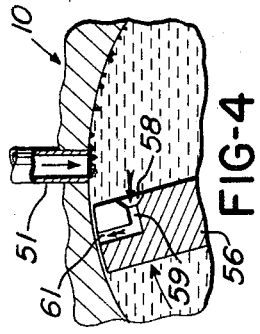
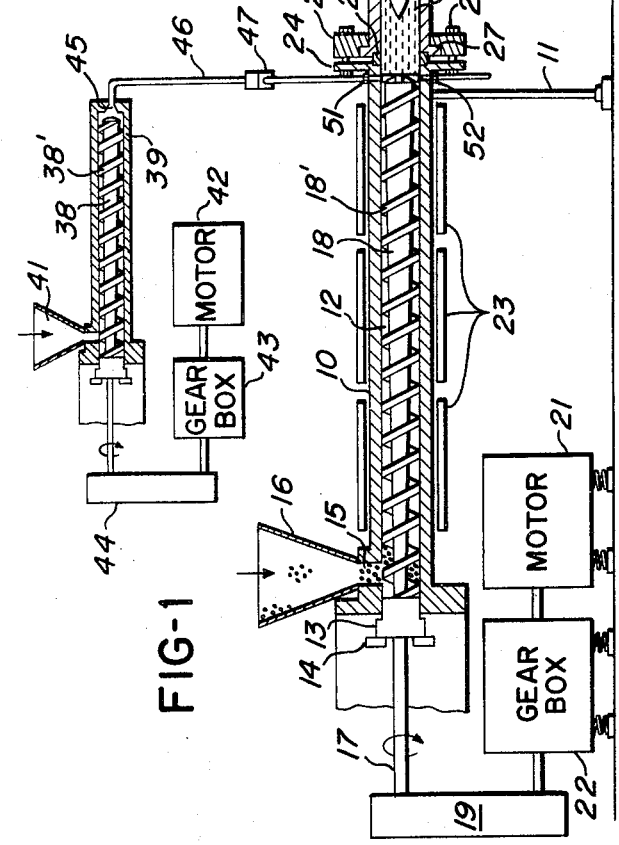
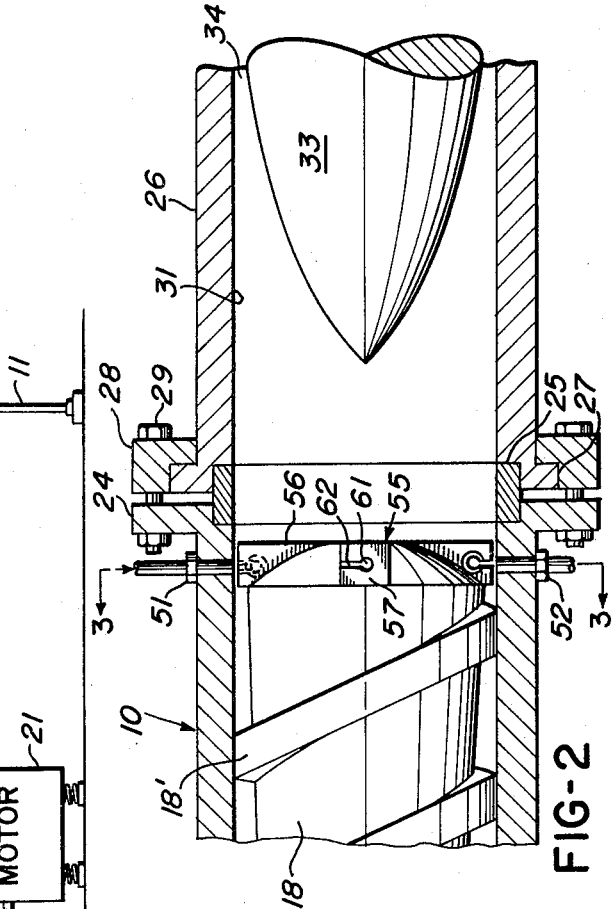

3,664,790
PLASTIC EXTRUSION APPARATUS
Irvin Hollander, Dayton, Ohio, assignor to
Tii Dee Products Co., Dayton, Ohio
Filed Dec. 5, 1969, Ser. No. 882,462
Int. Cl. B29f 3/02
U.S. Cl. 425—131     9 Claims

ABSTRACT OF THE DISCLOSURE

Plastics extrusion apparatus in which injector means add to a flowing stream of base material, ahead of the extrusion die, a supplemental plastic material in a controlled fluidized form. Bladed rotor means operate to direct that portion of the added material concentrate at circumferentially spaced locations on the periphery of the base flow. On relative advance there is produced in the base material a decorative surface streaking of the added material. The design thereof is dictated by the nature and rate of injection of added material and the rotor control of the base flow.

THE INVENTION

This invention relates to improvements in the art of plastic extrusion and, more particularly, to a means and method for effecting more distinctive and more decorative surface features on extruded articles.

BACKGROUND

In an extrusion process, solid plastic base material, usually in pellet form, is normally reduced to a fluid mass in a screw press and passed through an extrusion die which dictates its final form. Though the extrusion material may be suitably finished to produce thereon an acceptable surface condition, there has heretofore been no satisfactory means or method for variously simulating in the extrusion process per se the more decorative characteristics of a wood grain or other surface finish which would lend the finished articles beauty and greater commercial acceptance. Extruded plastic articles have always tended to have a relatively dull and drab look since their finish has been generally governed by the limited colors in which plastic pellets are available.

ILLUSTRATED EMBODIMENT OF THE INVENTION

The present invention opens the market for new and greater application of plastic extrusions by enabling that they be economically rendered more decorative and pleasing to the eye. It provides a means and method for simply producing a great variety of surface impressions in an extrusion process. This is achieved by a controlled injection of a supplemental fluidized plastic to the surface of a flowing plastic mass as the latter is subjected to a unique rotor influence just prior to its passage through a forming or extrusion die. In the preferred embodiment here described, the rotor employed has radial blades the tips of which are apertured or slotted to induce portions of the base material in its path to thread therethrough and merge with portions of the injected materials in a manner to dictate the area and direction of the concentration and spread of the injected materials. The result of the process and the apparatus emloyed is a new, unique and a more permanent finish on extruded plastic articles, which finish may be versatilely applied and in any event have unusual eye appeal.

It is therefore a primary object of the invention to provide a new means and method for producing a decorative and/or utilitarian finish on extruded plastic articles which are economical to employ, or efficient and satisfactory in use and highly versatile in application.

Another object of the invention is to simply and effectively integrate in the surface of extruded articles a substance which has a characteristic distinguishing it from the base material of which the article is formed.

A further object of the invention is to provide apparatus by means of which one may simply apply a unique decorative finish to extruded products, which finish is infinitely variable in character.

An additional object of the invention is to introduce a new concept of adding supplemental materials in an extrusion press to effect distinguishing features in the extruded article.

Another object of the invention is to provide a unique process to direct the addition of supplemental materials to integrate in a flowing plastic mass in a manner to disseminate a selected pattern of color in the resultant article.

A further object of the invention is to provide means achieving the foregoing and other objects which is readily adaptable to existing extrusion press installations.

An additional object of the invention is to provide the means and method of applying a variable yet permanent decorative finish on extruded plastic articles in the course of their extrusion possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein is shown one but obviously not necessarily the only form of embodiment of the invention, FIG. 1 is a diagrammatic view of apparatus for extruding plastic articles embodying the inventive concept;

FIG. 2 is a fragmentary view, relatively enlarged, diagrammatically detailing a critical portion of the apparatus of FIG. 1;

FIG. 3 is a sectional view, again diagrammatic in context, taken substantially along line 3—3 of FIG. 2;

FIG. 4 is a fragmentary enlarged view of a portion of FIG. 3 showing rotor blade means in an advancing position referenced to a supplemental material injector station as contemplated in a press in accordance with the invention;

FIG. 5 is a view like FIG. 4 showing the rotor blade means in a further advanced position;

FIG. 6 is a fragmentary perspective view of the connection of the rotor means to the feed screw of the press illustrated in FIG. 1;

FIG. 7 is an end view of the outer tip of a blade of the rotor means;

FIG. 8 is a sectional view taken substantially along line 8—8 of FIG. 7;

FIG. 9 is a view similar to FIG. 7 showing an alternate form of the rotor blade tip;

FIG. 10 is a sectional view taken substantially along line 10—10 of FIG. 9;

FIG. 11 is a view in perspective of a segment of tube or pipe as extruded by the apparatus of the invention;

FIG. 12 is a sectional view taken along the line 12—12 of FIG. 11;

FIG. 13 is a view like FIG. 11 showing that striations may be formed in the surface of an extruded article to have an undulating form; and FIG. 14 is a view of a tube segment similar to that of FIG. 11 which in the fabrication thereof has been so controlled to produce thereon intermittent protuberances giving the same a bamboo-like effect to the finished product.

Like parts are indicated by similar characters of reference throughout the several views.

DESCRIPTION OF A PREFERRED EMBODIMENT

Referring to the drawings, the invention is there illustrated as embodied in a system utilizing a screw press type extruder. The system is shown diagrammatically in FIG. 1 to include a press barrel 10 supported in elevated relation to a floor level by means including plural, vertically projected and longitudinally spaced supports 11. The detail of the latter is not specific to the invention and need not be further described. As to the barrel 10, this is imperforate and has a conventional elongated cylindrical configuration. It is so constructed as to be highly resistant to the internal pressures which are normally developed in an extrusion process. The barrel 10 has a bore 12 which extends from end to end thereof. Installed in one end of the bore 12 is a tubular bushing 13 having an expanded head outermost which is backed by and has a reactant thrust upon a bearing 14 during the extrusion process. Opening to the bore 12 through the barrel 10 and adjacent that end which is closed by the bushing 13 is a radial inlet 15 accommodating the discharge end of a hopper 16. The latter is utilized to introduce the feed materials to the bore 12.

Projecting interiorly of the bore 12, through and in bearing relation to a bushing 13, is a drive shaft 17. The innermost end of the shaft 17 has in connection therewith means defining a continuous screw 18. The root or shaft portion of the screw has a progressively increasing diameter from the end thereof adjacent the inlet 15. As thus formed, it has a conically expanding shape. Formed integral with the root of the screw are flights 18' which have a substantially uniform pitch and diameter and dimensioned to be in substantial bearing contact with the wall of the bore 12. It will be seen that due to the configuration of the root and the flight portions of the screw the channels between adjacent flights become progressively more shallow from what may be considered the driven end of the screw to the discharge end thereof. It will be noted, as diagrammatically shown in FIG. 1, that the shaft 17 is driven through the medium of a transmission unit 19 from a motor 21. The latter connects to the transmission unit through a gear box 22. There is an optional gear selection as referenced to the gear box 22 and in this manner the speed of rotation of the drive shaft 17 and consequently of the screw means 18 may be selectively varied.

As illustrated, in surrounding longitudinally spaced relation to the barrel 12 are band-type resistant heater 23. These have in connection therewith suitable energizing means, the details of which are not here pertinent, by means of which they may conduct heat to and through the barrel 10 to materials within the bore 12. Of course, cooling means may be provided in conjunction with the heaters 23 as may be necessary or desirable to suit the operating requirements of the particular production facility.

Referring to FIGS. 1 and 2, it will be seen that the outer end of the barrel 10 is formed with an external flange 24 counterbored to seat therein an extension of the barrel 10 in the form of an adapter ring 25. In continuing relation to the barrel 10 and the adapter ring 25 is a tubular die fitting 26. A mating end of the fitting 26 is counterbored to nest the projected end of the adapter ring 25 and is also formed with a flange 27 projecting similarly to the flange 24 and in facing relation thereto. The flange 27 is nested in a cap-type clamp 28 which surrounds and bears on the outer surface of the die fitting 26 and accommodates projection therethrough of bolts 29 by means of which the assembly of the elements 25, 26 and 28 may be fixed in reference to the flange 24 and thereby to the barrel 10. It will be noted that the fitting 26 as well as the adapter 25 has an internal diameter which is identical with that of the bore 12. For purposes of convenience and description, the bore of the fitting 26 is identified as 31.

The fitting 26 may accommodate any desired die form to produce an extruded article of the selected shape. In this case, there is illustrated an extrusion in tube form. However, it should be understood that the invention can be applied equally to the production of sheets and other various configurations to the making of which the principle of plastics extrusion can be applied. More particularly, referring to FIG. 1, there is diagrammatically shown the die required as created by a spider 32 consisting of a bullet nose core 33 positioned axially of the bore 31 and coaxial with its central axis, which core is supported in this position by circumferentially spaced radially projected pinlike supports which are engaged to the inner wall of the fitting 26. As the core 33 is so positioned, it defines thereabout a substantially annular flow passage 34 intersected only by the support pins forming part of the spider 32. It will be seen, moreover, that the core 33 terminates and has its largest cross sectional dimension in a plane coincident with the projected extremity of the fitting 26. It defines thereby an exit 35 for the tube form which is created on passage of plastic material from the fitting 26.

In conventionally utilizing the structure just described, dry plastic material, usually in the form of discrete pellets, is placed in the hopper 16 and caused to descend by gravity through the barrel inlet 15 to the bore 12. On energizing the motor 21, screw 18 is driven through the medium of the connected drive shaft 17, in response to which the pellet material is picked up in the relatively deepest channelled drive end of the screw 18. In response to the continued rotation of the screw, the material is advanced longitudinally of the bore 12, moving between the successive flights of the screw and thereby being forced into ever decreasing channels between the flights. By this means, the plastic pellet material is sequentially and progressively compressed so that as it arrives at the discharge end of the screw, it has assumed a fluid plastic form. The fluid condition of the pellets at this point is insured by the appropriate utilization of the heaters 23 which expedite the fluidizing process in the course of compressing the pellets. Absent the inventive concept, the fluid plastic material would progress through the adapter 25 to the bore 31 of fitting 26 and in the course of passing from the fitting the plastic will be caused to assume a thin walled tube form as it flows past the core 33 and the supporting pins which together therewith form the die configuration required to produce the tubing. Of course, it is to be understood that the word tubing and pipe are synonymous in this instance. It is diagrammatically shown in FIG. 1 that once the plastic material is conventionally extruded through the annular passage 34 and discharges from the exit 35 in the tubular or pipe form P, the formed material is in the subsequent steps subjected to sizing and cooling operations, carried out for example at a station 36 which may comprise a water trough and sizing rings. Leaving station 36, the sized and cooled tubing P will encounter and pass through a puller means 37 and is subsequently directed thereby to cutting or other treatment stations therebeyond. The operation of this system is continuous and the puller means 37 exerts a continuous axial pull on the formed product, insuring a steady movement thereof as it discharges from the exit 35 to subsequent treatment stations until the desired final product is achieved. As noted, the steps and the structure utilized beyond the fitting 26 are well known and may be conventionally employed and therefore the details thereof need not be further explored for an understanding of the present invention.

A plastic extrusion process and system may of course comprise components other than those here illustrated and described but the particular detail thereof is not important to achieving the present invention which will become obvious from the following.

The present invention has in view the addition to the fluid mass of the basic plastic material which is utilized of a supplemental material which will lend distinguishing properties or characteristics to the product which finally emerges from the fitting 26. While the properties endowed by the supplemental material may be varied, for purpose of illustrating a most significant application and achievement of the invention, it will be here considered that the material to be added is for the purpose of achieving in a simple and economical manner a wide range of decorative finish, of various design, on the surface of the extruded article.

In the embodiment of the invention to illustrate here the practice of the invention, there is diagrammatically shown in FIG. 1 a supplemental screw type extrusion press including an imperforate press barrel 39 containing a rotatable screw 38 of a nature similar to the screw 18. The screw 38 is driven similarly to the screw 18 through the medium of a motor 42 and by way of a selected gearing 43 and transmission unit 44. In the case of the barrel 39 the feed inlet remote from its discharge end accommodates the discharge end of the hopper 41 through which the supplemental material may be fed to the screw 38. In the practice of the invention there is fed into the hopper 41 in this instance plastic pellets of different color than that of the base material and either along or together with supplemental materials which are mutually moved into the relatively deep channels between the flights at the receiving end of the screw 38. As the materials are advanced through the bore of the barrel 39 they are progressively compressed as described with reference to the basic screw press and with selective applications of heat or not, as the situation may require, the supplemental materials are quickly reduced to a highly fluid form for discharge from the barrel 39 by way of the discharge opening 45. It is here noted that the fluidity of the materials issuing from the barrel 39 may be of a greater degree than that of the basic material which is being discharged by the screw 18 in the barrel 10. As seen, the outlet 45 of the barrel 39 is defined by the receiving end of a tube 46. The remote end of the tube 46 connects into a fitting 47 providing a chamber from which lead a plurality of extension tubes, illustrated by the tubes 48 and 49 which are diagrammatically shown to lead respectively to diametrically opposed locations of the barrel 10 immediately adjacent the discharge extremity of the screw 18. At such locations, as particularly shown in FIGS. 2 and 3 of the drawings, the barrel 10 is provided with radially directed apertures respectively accommodating fittings 51 and 52 into which respectively project the discharge ends of the tubes 48 and 49. It is thus seen that as both the screws 18 and 38 are energized to deliver the respective materials which are fed thereto, the screw 18 will be moving a basic plastic mass which has achieved a fluid condition as it arrives in the vicinity of the discharge from the fittings 51 and 52. Moreover, at the point of reaching the plane of the fittings 51 and 52, the rotating fluid mass under the influence of the screw 18 will have impinged thereon, on its outer periphery, the discharge of the more fluid supplemental materials which are passing in jet form from the fittings 51 and 52 to the interior of the bore 12.

It has been noted that the location of the fittings 51 and 52 is such to place them generally within the transverse plane of the outer or delivery end of the screw 18. Attention is now directed to the fact that this outer end of the root portion of the screw is formed with intersecting slots 53 and 54 which are placed at right angles to each other. Inserted in the radial segments of the discharge extremity of the screw 18 created by the slots 53 and 54 which intersect at right angles to each other is a rotor assembly 55 including blade means 56. The respective extremities of the blade means 56 project radially outward in respect to each slot and the root of the screw means 18 to terminate, respectively, in adjacent closely spaced relation to the inner wall of the discharge end of the bore 12 and in the paths of the discharge from the fittings 51 and 52. It will of course be obvious that in the illustrated instance there are four such blades but it will also be evident that a greater or lesser number could be applied, if desired, with suitable accommodation being mechanically effected in reference to the screw means.

Thus, it will be self-evident, particularly from FIGS. 2 and 3 of the drawings, that the supplemental material discharge will be in a plane common to that of the rotor blade means 56.

The radially projected extremity of each blade means in the example illustrated has an arcuate curving surface 57, the curving being in conformance with the curvature of the wall of the bore 12. There is indicated in FIG. 3 a contemplated direction of rotation of the screw and correspondingly the blade means 56 as referenced to the fittings 51 and 52. Accordingly, it will be seen that the blades which have a generally rectangular cross section in this instance have leading and trailing faces relative to the direction of their rotation. In the leading face and in the outer extremity of each blade, near its surface 57, is formed a conically convergent recess 58 the inner end of which is connected by a small bore 59 to the innermost end of a radial passage 61 which extends axially of the blade 56 and opens through the tip surface 57. The leading face of each blade 56 is further formed with a slot 62 which intersects recess 58, bore 59, passage 61 and tip surface 57.

Let us now consider the effect of the supplemental feed of a more fluid material of distinguishing characteristic from the base plastic mass in fluid form as well as the application of the rotor including the blades 56 in a plane generally common to that in which the supplemental material is injected by way of fittings 51 and 52.

As previously described, in the conventional operation of the screw means 18 and with the application of the heaters 23 to the barrel 10 there is produced a conversion of the pellets of plastic material fed to the screw 18 to a fluid plastic mass as it arrives in a highly compressed form at the discharge end of the screw and the barrel 10. As noted previously, the basic plastic mass is not only being compressed and fluidized as it moves through the barrel 10, it will also have in the course of compression a rotative influence thereon. Thus, with the placement of the injection means for the supplemental material and the rotor means 55 at the point where the basic mass discharges from the screw means 18, they will intersect a fluid mass which not only has a rotative influence on it but at a point where the compression thereon is released so the mass expands to fill the area within the adapter 25 and in fitting 26 beyond the screw. As the basic material moves from compression to an expanded condition it will have a different rotative influence applied thereon by the projected extremity of the blade means 56. This will have a disturbing influence on the plastic mass and there will be a back pressure in the expanded form thereof. Due to the back pressure and the advancing movement of the circumferentially spaced tips of the blades 56, circularly spaced portions of the basic mass within the frame of the rotor means 55 will be forced to move interiorly of the conical recesses 58, the passages 59 and 61 and slots 62 to exit at the tip of each blade in a thread-like accelerated and well defined form, rising up at the periphery of the fluid mass. Noting FIG. 3, it will be seen that in the example illustrated that cyclically the passages 61 will have their discharge extremities at the tips 57 of blades 56 in full register with the openings from the fittings 51 and 52. As this occurs, the threads of material that move outwardly of the blade tips will directly encounter and merge with the supplemental material that is being delivered in this highly fluid form through the fittings 51 and 52.

It will be seen therefore that the basic plastic mass will be continuously axially moved from the screw 18 between and around the blades 56 of the rotor 55. As noted, with the expanding and filling of the chamber defined by the extension of the bore 12, the rotative influence of the screw means on the moving basic material is essentially diminished so that beyond the screw means 18, absent the rotor means, there would be essentially no disturbing influence on the basic plastic mass. However, in accordance with the practice of the invention, there is imposed a specific type of relative motion of blades in respect to the basic mass whereby the blades are advanced in reference thereto and some of the basic mass is forced by the relative motion to enter the leading faces of the blades by way of the conical recesses and to discharge from the arcuate tip surfaces 57. In the example illustrated, it will therefore be seen that each of the blades is continuously creating the rising to its outer peripheral surface of a portion of the basic material in a thread-like form to have a defined position on the surface. This of course disturbs the surface material from what would be normally anticipated in the extrusion process. It is noted, of course, that in the example illustrated there is a continuous injection to the peripheral surface of the plastic mass as it issues from the screw 18 of a thin jet injection of the supplemental material. Intermediate the blades, as the materials hit the outer peripheral surface of the mass the position in which they will concentrate to a greater degree will be in the areas where the surface has been disturbed or remains disturbed from the threading of the portions of the basic mass thereto. It is also obvious that as there is rotation of the mass through the rotor mean, in the area of and in the plane in which the material is injected that there will be some lateral spreading across the entire circumference of the material. Nevertheless, the nature and characteristic of the disturbance of the basic plastic mass is such that there will be produced by the disturbance thereof more defined streaking at certain circumferentially spaced locations, which streaking is extended as a peripheral striation in the mass. By maintaining the extreme fluidity of the supplemental material and by the nature of the agitation here effected by the rotor means the supplemental material is essentially kept or limited to the area of the peripheral surface of the moving mass. Where there is a direct alignment of threads and the adapters 51 and 52 there is of course a controlled concentration of the material in these areas which while spread to some degree will still determine most specifically the area of concentration of the supplemental material as it is extended in the form of striation longitudinally of the mass progressing past the area or plane of the adapters 51 and 52.

Considering the fact that the color and pattern influence of the supplemental material is most important in the illustrated application of the invention, it will be seen that by control of the nature and the fluidity of the supplemental material which is added to the basic mass and by control of the positions on the periphery of the basic mass which are particularly disturbed and in a particular manner in the plane of injection one can create any desired peripheral pattern of integration of the supplemental material. FIGS. 11 through 14 are illustrative of merely some variation in the form of application and integration of the supplemental material.

It is noted here that the blades 56 are here rotated at screw speed. The rotor means may be differentially driven by independent means, if so desired, to achieve a different disturbance or agitating of the mass issuing from the screw means in the general area of the injection of the supplemental material.

Thus, the surface or body of the plastic mass which is basic to the product is modified to concentrate therein in the example illustrated supplemental material as linear streaks in circumferentially spaced relation along and about the periphery of the formed article. This is as a function and direct result of all the variations in effect which can be applied to the movement and disturbance of the basic mass.

FIGS. 11 and 12 show that in accordance with one combination of variables used in the production of plastic tubing or pipe, one can achieve a highly attractive and expensive looking wood grain finish in which there have been produced in the product widely spaced concentrated streaks 63 separated by a plurality of more closely spaced apart narrow streaks 64. The effect gained is not one of precise machine-like regularity but a more natural appearance in which the linear streaks blend with one another and have portions of varying color intensity. To produce heightened effects of this kind the supplemental material supplied to the hopper 41 may be a mixture of plastic materials of different color and incompatible in the sense of having different melting temperatures. It is noted that materials need only be partly plasticized to mix with the fully plasticized material in achieving an irregular natural grain finish to the produced article. Thus, while a high degree of fluidity may be desirable in reference to the supplemental material added in some applications, where one wishes to produce either a different decorative or a different physical property by the addition of material to the base material, one can vary the character of the materials delivered without departing from the concept of the invention. For example, one can even mix into the plastic of the supplemental materials just as described wood chips or fluid metals or other foreign articles which will be embodied in the mass delivered in fluid form to the basic mass and become integrated in the surface by reason of the nature of the disturbance achieved in the basic mass as the materials are applied to the outer surface through the fittings 51 and 52.

Other effects are possible for example swirling or undulating striations 65 may be achieved the length of a pipe P1 as in FIG. 13. This can be produced by intermittently twisting the emerging pipe material beyond the die fitting 26 and before it is cooled to its final form. In FIG. 14 a pipe P2 is shown as having longitudinally spaced bulbous protuberances 66. These may be produced by momentarily halting advance of the produced pipe or tubing from the fitting 26 in areas immediately proceding cooling to cause localized buckling. The effect which may be gained in conjunction with the longitudinal striations is that of bamboo material. As previously noted, the invention is equally applicable to extrusion apparatus producing sheet material, tape and other shapes. Whatever the shape, the supplemental material peripherally added will automatically apply and spread in the nature described and under the control of the regulation of the various functional aspects of the extrusion process. Of course, the rate of feed of the supplemental material may be controlled by a suitable means to influence the end result. It is unnecessary, in this connection, that feeding of the supplemental material be continuous. Further, while for the application illustrated we get an optimal result by the co-planar relation of the rotor means and the injection fittings, this is not completely essential, there can be a relative displacement of a limited degree which would produce varying but similarly advantageous results.

While a single slotted form of the blade tips has been described, this can be varied to suit the application. For example, the slot 62 can be extended to open from both the leading and trailing faces of the blade tips. This is shown in FIGS. 9 and 10 wherein is illustrated a blade 67 corresponding to the blade 56 as having a conical recess 68 in the leading face, an axial passage 69 opening through the tip of the device and a bore 71 interconnecting recess 68 and passage 69. In addition the slot 72 is cut through the blade tip from the leading side to the trailing side and in intersecting relation to the passageway defined by the recess 68, passage 69 and bore 71. In this as well as the preceding form of blade tip, the relatively broad conical recess in the leading side acts as a funnel to concentrate the material which flows therethrough so that it will be forced to the tip of the surface 57 to meet with supplemental material and create an impregnation thereof in areas of greater or less concentration depending on the nature and the character of the threading procedure which disturbs the basic plastic flow.

There has been thus described a completely unique process and apparatus for lending a greater acceptability of extruded plastic products for a great number of uses. It should be self-evident that the impregnating material may have various physical and utilitarian aspects that can be employed by people versed in various of the arts that utilize plastic extrusions in the fabrication of their end products and systems.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Apparatus for impregnating extruded plastic articles with supplemental materials to create therein distinguishing characteristics comprising means defining a flow passage having an inlet thereto and an outlet therefrom, means for producing in said passage a flow of a plastic mass to be converted to an extruded article of selected form, an extrusion or forming die arranged to dictate said selected form, means for injecting in said passage supplemental material, and means for disturbing the flowing mass in the area of said injection to influence said supplemental material to move into and integrate with said mass in a predetermined pattern, said disturbing means having a channeling form to create thread-like portions of the flowing plastic mass interiorly thereof and to direct the same outwardly from the mass interior to the periphery thereof to merge with injected material on entry thereof to said passage.

2. Apparatus as set forth in claim 1, wherein said flow passage is defined at least in part by a screw press, said disturbing means including a bladed rotor in a following relation to the screw press and in a preceding relation to said die, said injecting means opening to said flow passage at least at the periphery of said bladed rotor.

3. Apparatus as set forth in claim 2, characterized by portions of said bladed rotor of channeling form including inlet openings in leading surface portions of blades of said rotor connected to radially directed thread-like channels in said rotor through which are pressured, in operation of said rotor, threads of said plastic mass, said injecting means being so arranged so the dicharge thereof is picked up and disseminated by said threads of said plastic mass.

4. Apparatus as set forth in claim 1, wherein the projected discharge extremity of the screw in said screw press has in connection therewith said bladed rotor.

5. Apparatus for impregnating extruded plastic articles with supplemental materials to create therein distinguishing characteristics, comprising a press barrel, screw means rotatable in said barrel to plasticize and convey a base plastic material under pressure, die means to which the plasticized material is fed by said screw means to be extruded therethrough as an article of selected shape, said screw means terminating at an inner end thereof in advance of said die, injector means angularly positioned circumferentially of said press barrel to introduce a supplemental material substantially at the inner end of said screw means, and blade means rotating with said screw means in a substantially wiping relation to said injector means, said blade means being mounted to said inner end of said screw means in a transverse plane of said barrel occupied by said injector means to cooperate therewith to streak the surface of the extruded article with said supplemental material, said supplemental material being a plastic of relatively low melting point as compared to the base plastic material and being injected at a relatively lower density, said blade means including at least one arm having its outer tip terminating in adjacent relation to the inner periphery of the barrel, said arm having inwardly of its outer tip an entrance opening and having further a passage leading from said entrance opening to and through said outer tip through which material is forced by rotation of said blade means through the mass of material beyond the said inner end of said screw means.

6. Apparatus for impregnating extruded plastic articles with supplemental materials to create therein distinguishing characteristics, comprising a press barrel, screw means rotatable in said barrel to plasticize and convey a base plastic material under pressure, die means to which the plasticized material is fed by said screw means to be extruded therethrough as an article of selected shape, said screw means terminating at an inner end thereof in advance of said die, injector means angularly positioned circumferentially of said press barrel to introduce a supplemental material substantially at the inner end of said screw means, and blade means rotating with said screw means in a substantially wiping relation to said injector means, said blade means being mounted to said inner end of said screw means in a transverse plane of said barrel occupied by said injector means to cooperate therewith to streak the surface of the extruded article with said supplemental material, said supplemental material being a plastic of relatively low melting point as compared to the base plastic material and being injected at a relatively lower density, said blade means comprising one or more blades having a length corresponding approximately to the diameter of said screw means and defining in its rotation and with respect to the inner periphery of the barrel a thin annular passage for an outer peripheral portion of plastic material advancing from said screw means, said blade having a passage through an outer end portion thereof by which material in the flowing mass adjacent said inner end of said screw means is picked up responsive to rotation of said blade and forced into said annular passage.

7. Apparatus according to claim 6, wherein each blade has a flat side serving as a leading surface in relation to the direction of rotation of said blade means, said passage including a wide mouth entrance opening in said flat side, the outer tip of the blade having a discharge opening in relatively restricted communication with said entrance opening.

8. Apparatus for impregnating extruded plastic articles with supplemental materials to create therein distinguishing characteristics, comprising a press barrel, means rotatable in said barrel to plasticize and convey a base plastic material under pressure, die means to which the plasticized material is fed by said rotatable means to be extruded therethrough as an article of selected shape, said rotatable means terminating at an inner end thereof in advance of said die, the barrel intermediate the inner end of said rotatable means and said die means forming a chamber filling with plasticized material under the influence of back pressure imposed by said die means, injector means for introducing a supplemental material into said chamber, and blade means in said chamber arranged to move in a substantially wiping relation to said injector means and rotatable in the mass of material filling said chamber, said blade means being mounted adjacent said inner end of said screw means and including material channeling means cooperating with said injector means to orient the supplemental material in the plasticized material in a predetermined streaked pattern.

9. Apparatus according to claim 8, wherein said blade means includes at least one arm extending radially across the interior of the press barrel beyond the said inner end of said rotatable means and substantially at the location of said injector means.

References Cited

UNITED STATES PATENTS

| | | | |
|---|---|---|---|
| 2,803,041 | 8/1957 | Hill et al. | 18—(12 SN UX) |
| 3,274,646 | 9/1966 | Krystof | 18—13 (P) |
| 3,160,688 | 12/1964 | Aykanian et al. | 18—12 (SN) X |
| 3,344,215 | 9/1967 | De Witz et al. | 18—(12 SN UX) |
| 3,334,163 | 8/1967 | Gilbert | 18—12 (SN) X |
| 3,422,175 | 1/1969 | Rowland | 18—13 (P) X |
| 3,477,698 | 11/1969 | Smith et al. | 18—12 (SN) X |

J. SPENCER OVERHOLSER, Primary Examiner

M. O. SUTTON, Assistant Examiner

U.S. Cl. X.R.

425—207, 380